US011993956B2

(12) United States Patent
Hamand et al.

(10) Patent No.: US 11,993,956 B2
(45) Date of Patent: May 28, 2024

(54) SLIDING DOOR FOOT BOLT

(71) Applicant: Pella Corporation, Pella, IA (US)

(72) Inventors: Michael Hamand, Newton, IA (US); Elliot C. Suiter, Johnston, IA (US); Scott Burns, Rochester, MI (US)

(73) Assignee: Pella Corporation

( * ) Notice: Subject to any disclaimer, the term of this patent is extended or adjusted under 35 U.S.C. 154(b) by 848 days.

(21) Appl. No.: 17/040,451

(22) PCT Filed: Mar. 23, 2018

(86) PCT No.: PCT/US2018/024110
§ 371 (c)(1),
(2) Date: Sep. 22, 2020

(87) PCT Pub. No.: WO2019/182615
PCT Pub. Date: Sep. 26, 2019

(65) Prior Publication Data

US 2021/0025197 A1 Jan. 28, 2021

(51) Int. Cl.

| | |
|---|---|
| ***E05B 65/08*** | (2006.01) |
| ***E05C 3/04*** | (2006.01) |
| ***E05C 7/02*** | (2006.01) |
| ***E05C 17/44*** | (2006.01) |
| *E05C 7/00* | (2006.01) |

(52) U.S. Cl.
CPC .......... *E05B 65/08* (2013.01); *E05B 65/0835* (2013.01); *E05C 3/048* (2013.01); *E05C 7/02* (2013.01); *E05C 17/443* (2013.01); *E05C 2007/007* (2013.01); *E05Y 2900/132* (2013.01); *E05Y 2900/148* (2013.01)

(58) Field of Classification Search
CPC .... E05C 17/60; E05C 17/50; E05C 2007/007; E05C 19/022; E05B 65/08; E05B 9/02
See application file for complete search history.

(56) References Cited

U.S. PATENT DOCUMENTS 526,262 A 9/1894 Rolffes
1,032,559 A * 7/1912 McKee ............... E05B 15/0093 292/210
(Continued)

OTHER PUBLICATIONS

International Search Report and Written Opinion issued in PCT/US2018/024110 dated Jun. 25, 2018, 16 pages.
(Continued)

*Primary Examiner* — Justin B Rephann
(74) *Attorney, Agent, or Firm* — FAEGRE DRINKER BIDDLE & REATH

(57) ABSTRACT

A lock kit for a fenestration assembly includes a panel stop. The fenestration assembly includes a first panel and a second panel, at least one of the first and second panels being slideable relative the other of the first and second panels. The panel stop is configured to pivotably mount within a recess of a frame member of the first panel and pivot between a first stop position configured to maintain the first and second panels in a fully closed position, a second stop position configured to limit sliding of the first and second panels beyond a preset partially-open position, and a third position substantially within the recess, the third position being configured to not restrict a range of motion of the first and second panels.

21 Claims, 9 Drawing Sheets

(56) References Cited

U.S. PATENT DOCUMENTS

| | | | | |
|---|---|---|---|---|
| 2,011,455 | A * | 8/1935 | Ostermann | E05D 13/06 292/213 |
| 3,083,045 | A * | 3/1963 | Linderoth | E05B 65/0847 49/413 |
| 3,151,901 | A * | 10/1964 | Aldgren | E05D 13/04 292/124 |
| 3,458,226 | A | 7/1969 | Carlston | |
| 2,637,579 | A | 5/1970 | Best | |
| 3,653,703 | A | 4/1972 | Lochner | |
| 4,080,758 | A | 3/1978 | Hubbard | |
| 4,248,461 | A | 2/1981 | Stevens | |
| 4,917,416 | A * | 4/1990 | Westphal | E05C 1/04 292/DIG. 47 |
| 4,923,230 | A * | 5/1990 | Simpson | E05B 65/0852 292/DIG. 47 |
| 4,938,508 | A | 7/1990 | Thomas | |
| 4,993,759 | A | 2/1991 | Thomas | |
| 5,172,945 | A | 12/1992 | Doherty et al. | |
| 5,248,174 | A * | 9/1993 | Matz | E05B 65/0852 292/DIG. 47 |
| 1,615,754 | A | 1/1994 | Jack | |
| 5,409,271 | A | 4/1995 | Hoffmann | |
| 5,772,266 | A | 6/1998 | Skiba | |
| 5,865,480 | A | 2/1999 | Bain, Jr. et al. | |
| 5,983,680 | A | 11/1999 | Del Nin | |
| 6,065,785 | A | 5/2000 | Mantarakis et al. | |
| D526,262 | S | 8/2006 | Guevara | |
| 7,637,544 | B2 * | 12/2009 | Liang | E05C 17/50 292/DIG. 31 |
| 8,495,897 | B1 | 7/2013 | Koc | |
| 8,752,868 | B2 | 6/2014 | Kim | |
| 8,776,440 | B2 * | 7/2014 | Sopkowiak | E05B 65/0835 292/DIG. 47 |
| 8,789,862 | B2 * | 7/2014 | Liang | E05C 3/14 292/300 |
| 8,881,461 | B2 * | 11/2014 | Derham | E05B 65/0852 292/338 |
| 8,881,557 | B2 | 11/2014 | McEachern | |
| 9,091,103 | B2 | 7/2015 | Herman | |
| 9,328,542 | B2 | 5/2016 | Smed et al. | |
| 9,340,215 | B2 | 5/2016 | Masuda et al. | |
| 9,404,288 | B2 | 8/2016 | Curtis et al. | |
| 9,410,350 | B2 | 8/2016 | Stendal | |
| 9,435,149 | B1 * | 9/2016 | Glickman | E05C 17/60 |
| 9,482,034 | B2 | 11/2016 | Atkinson | |
| 9,546,505 | B1 | 1/2017 | McEachern | |
| 9,556,652 | B2 | 1/2017 | Lund | |
| 9,840,860 | B2 * | 12/2017 | Liang | E05B 63/0056 |
| 10,119,311 | B2 * | 11/2018 | Piltingsrud | E05C 17/46 |
| 11,168,495 | B1 * | 11/2021 | Liang | E05B 63/20 |
| 11,454,055 | B2 * | 9/2022 | Van Essen | E05C 17/02 |
| 2005/0011131 | A1 * | 1/2005 | Liang | E05D 13/04 49/449 |
| 2007/0046036 | A1 | 3/2007 | Kinsey | |
| 2007/0222234 | A1 * | 9/2007 | Liang | E05C 17/50 292/338 |
| 2009/0277905 | A1 | 11/2009 | Gillan | |
| 2010/0199726 | A1 * | 8/2010 | Varney | E05B 65/0852 292/216 |
| 2010/0300000 | A1 * | 12/2010 | Liang | E05B 65/0829 292/164 |
| 2012/0091734 | A1 | 4/2012 | Costabel et al. | |
| 2012/0144752 | A1 * | 6/2012 | Piltingsrud | E05C 17/02 49/506 |
| 2012/0167475 | A1 * | 7/2012 | Sopkowiak | E05C 17/60 49/506 |
| 2015/0015000 | A1 * | 1/2015 | Derham | E05C 7/005 292/194 |
| 2015/0159429 | A1 * | 6/2015 | Lund | E05C 17/50 292/300 |
| 2016/0130842 | A1 | 5/2016 | Ferri et al. | |
| 2016/0319577 | A1 * | 11/2016 | Liang | E05C 3/14 |
| 2017/0130482 | A1 | 5/2017 | Ek | |
| 2017/0183892 | A1 | 6/2017 | Kaukinen | |
| 2018/0209186 | A1 * | 7/2018 | Van Essen | E05C 17/02 |

OTHER PUBLICATIONS

Instructions for Angel Face Fixed Window Opening Control Device, Angel Ventlock, Tested to ASTM F2090 2008/2010, Mighton Products Ltd.

* cited by examiner

SLIDING DOOR FOOT BOLT

CROSS-REFERENCE TO RELATED APPLICATION

This application is a national stage application of PCT/US2018/024110 filed Mar. 23, 2018, which is incorporated by reference in its entirety.

BACKGROUND

There is a desire for ongoing improvements in fenestration hardware, such as hardware for sliding patio doors

SUMMARY

The disclosure pertains to a foot bolt or lock for a fenestration assembly (such as a sliding door). The lock may be manually actuated to limit travel of the fenestration assembly. Some examples include multiple lock positions providing alternative travel limits such as fully-closed and partially-open.

In one example, this disclosure is directed to a lock kit for a fenestration assembly including a first panel and a second panel, at least one of the first and second panels being slideable relative the other of the first and second panels. The lock kit comprises a panel stop configured to pivotably mount within a recess of a frame member of the first panel, the panel stop configured to pivot between a first stop position configured to maintain the first and second panels in a fully closed position, a second stop position configured to limit sliding of the first and second panels beyond a preset partially-open position, and a third position substantially within the recess, the third position being configured to not restrict a range of motion of the first and second panels.

In another example, this disclosure is directed to a fenestration assembly comprising a first panel including a first panel frame member forming a recess, a second panel including a second panel frame member, at least one of the first and second panels being slideable relative the other of the first and second panels, and a lock kit. The lock kit includes a panel stop pivotably mounted within the recess, the panel stop pivotable between a first stop position that maintains the first and second panels in a fully closed position, a second stop position that limits sliding of the first and second panels beyond a preset partially-open position, and a third position substantially within the recess, the third position not restricting a range of motion of the first and second panels.

In a different example, this disclosure is directed to a method of operating a lock kit of a fenestration assembly including a first panel and a second panel, at least one of the first and second panels being slideable relative the other of the first and second panels. The method comprises pivoting a panel stop mounted in a recess of a frame member of the first panel of the fenestration assembly from a third position substantially within the recess to a first stop position to maintain the first and second panels in a fully closed position, pivoting the panel stop mounted in the recess from the first stop position to the third position, the third position not restricting a range of motion of the first and second panels, and pivoting the panel stop mounted in the recess from the third position to the second stop position to limit sliding of the first and second panels beyond a preset partially-open position. In the first stop position, a first end of the panel stop extends from the recess of the first panel and engages a frame member of the second panel, In the second stop position, a protrusion proximate a second end of the panel stop extends from the recess of the first panel and engages the frame member of the second panel.

While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

DETAILED DESCRIPTION

Various aspects of the present disclosure are directed toward a foot bolt or lock for a fenestration assembly (such as a sliding door). The lock may be manually actuated to limit travel of the fenestration assembly. Some examples include lock multiple positions providing alternative travel limits such as fully-closed and partially-open limits.

Figure 1:
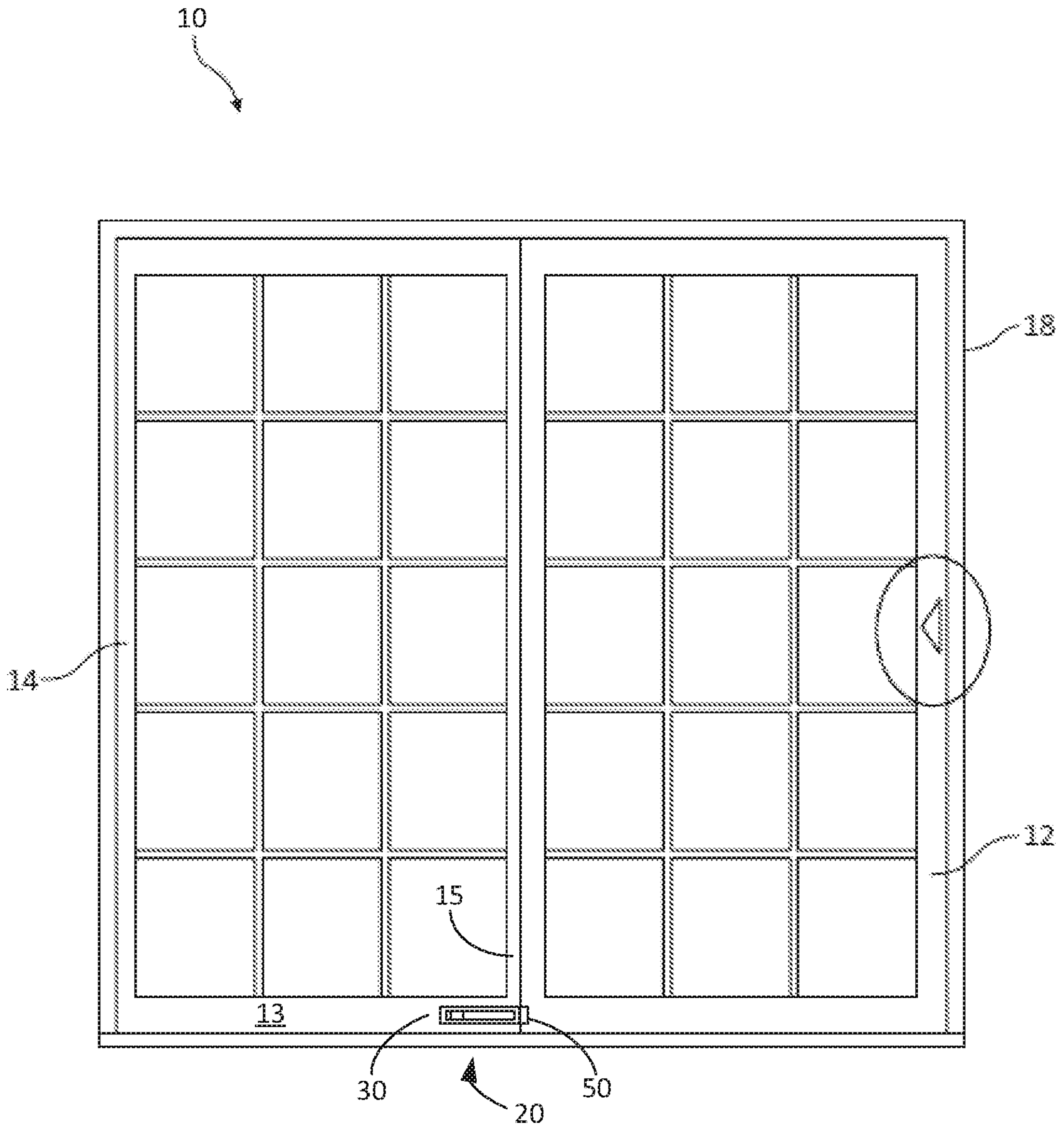
FIG. 1 is a schematic view of a fenestration assembly, according to some examples.

FIG. 1 is a schematic view of a fenestration assembly 10 when closed as viewed from inside a structure in which it is installed. Fenestration assembly 10 includes a first panel 12, a second panel 14, and a frame 18. The first panel 12 is a panel that opens by sliding, often termed a "vent" panel and the second panel 14 is optionally a stationary panel, often termed a "fixed" panel, or another vent panel. It is to be understood by one skilled in the art that the first panel 12 and second panel 14 described in the present disclosure may alternatively be a fixed panel and a vent panel, respectively. Panels of fenestration units (e.g., door panels) are often described in terms of vertical stiles and horizontal rails. Frame members of fenestration units are often described in terms of vertical side jambs, a horizontal head, and a horizontal sill. Some examples of suitable fenestration units usable with locking systems according to the instant disclosure include those sold under the trade name "ENCOMPASS," THERMASTAR," "250 SERIES," "350 SERIES," IMPERVIA," "PROLINE 450 SERIES," "ARCHITECT SERIES," and "DESIGNER SERIES" by Pella Corporation of Pella, Iowa.

Fenestration assembly 10 includes a frame 18 adapted to be received in a rough opening created in a building structure (not shown). Frame 18 can be constructed of wood, vinyl, aluminum, or a variety of other materials. In the illustrated example, frame 18 includes four peripheral frame members joined and secured together to form a rectangular shape corresponding to the shape of the rough opening. The inner perimeter of the rough opening is slightly larger than the perimeter of frame 18 of fenestration assembly 10, so that fenestration assembly 10 can be received in the rough opening during installation. The methods of mounting frame 18 to the rough opening are well known in the window industry.

As used herein the phrase "window frame" refers to a framework mounted in a rough opening of a building structure for receiving and supporting one or more sashes of a window assembly. As used herein, the term "sash" refers to a framework for receiving and supporting one or more glazing panes. In double hung, awning, and casement windows, the sashes can be moved relative to the window frame. In a fixed window, the sash does not typically move relative to the window frame, but can be removed for repair purposes. While the techniques of this disclosure are generally described with respect to sliding doors, one type of closure assembly, similar closure assemblies may also be included in window assemblies. In both sliding door and windows, there can be moveable sashes with or without fixed sashes. In various implementations, the moveable sashes move laterally or vertically.

In the usual manner, first panel 12 is slidably mounted within a roller track, for example, horizontal movement between the jambs. Panels 12, 14 may be made of durable material, such as wood, vinyl, aluminum or variety of other materials. The methods of making panels, such as sliding door panels and window sashes, are well known in the fenestration manufacturing industry. Panels 12, 14 each includes a glazing unit that is secured within frame members of panels 12, 14. The glazing units can include a single glass layer, two glass layers, or more. In some examples, glazing units can include various coatings that impact visible and/or UV light transmission.

Although the examples below are provided with general reference to sliding doors, it should be understood that these features are equally applicable to sliding windows. As such, each example below should also be considered applicable to other types of fenestration units, such as sliding windows including one or more sliding window sashes.

FIG. 1 further illustrates lock kit 20. Lock kit 20 includes panel stop assembly 30 within a recess of a horizontal rail 13 of second panel 14, and may or may not include a stop catch 50 mounted to vertical side jamb 15 of first panel 12 adjacent to second panel 14. Additionally or alternatively, the first panel 12 may include a stop assembly 30 and the second panel 14 may include a stop catch 50. Panel stop assembly 30 includes a panel stop 32 (FIG. 2) pivotable between a first stop position configured to maintain the first and second panels 12, 14 in a fully closed position, a second stop position configured to limit sliding of the panels 12, 14 beyond a preset partially-open position, and a third position substantially within the recess of the horizontal rail 13. In the third position, panel stop 32 does not restrict a range of motion of panels 12, 14.

Figure 2A:
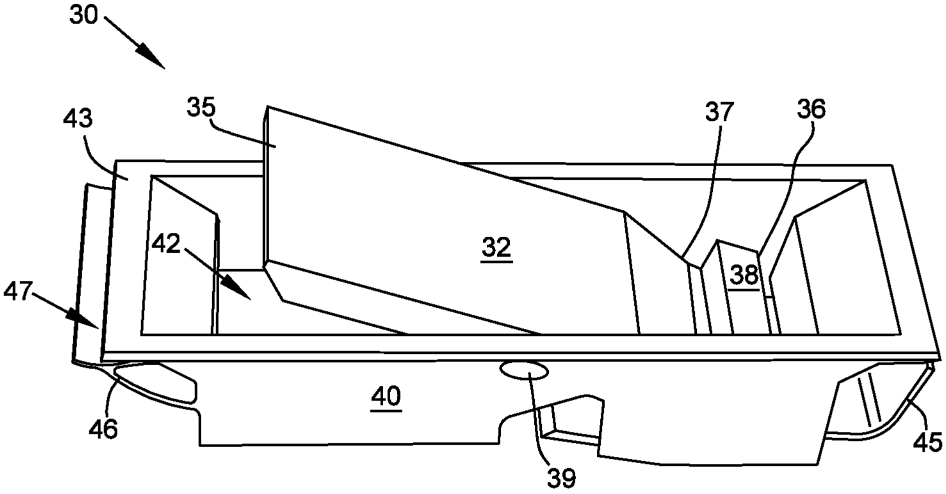
FIGS. 2A-2E illustrate a panel stop assembly including a panel stop pivotably mounted within a recess of a panel stop outer casing via a pin.
Figure 2B:
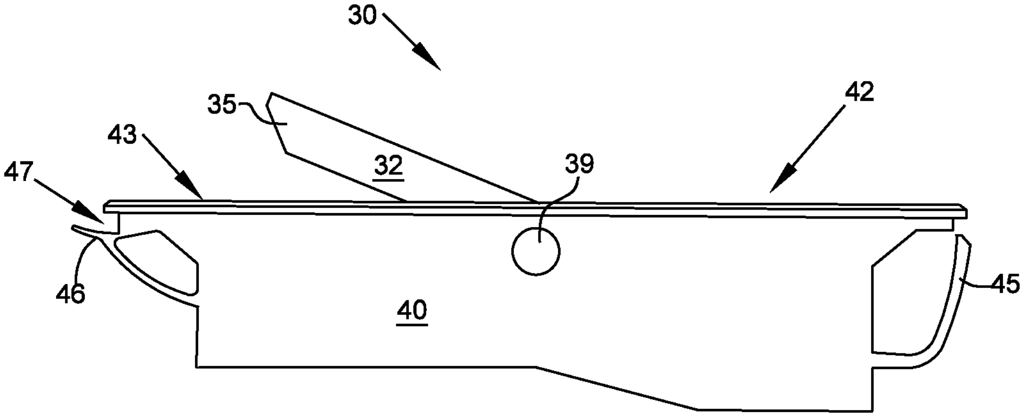
Figure 2C:
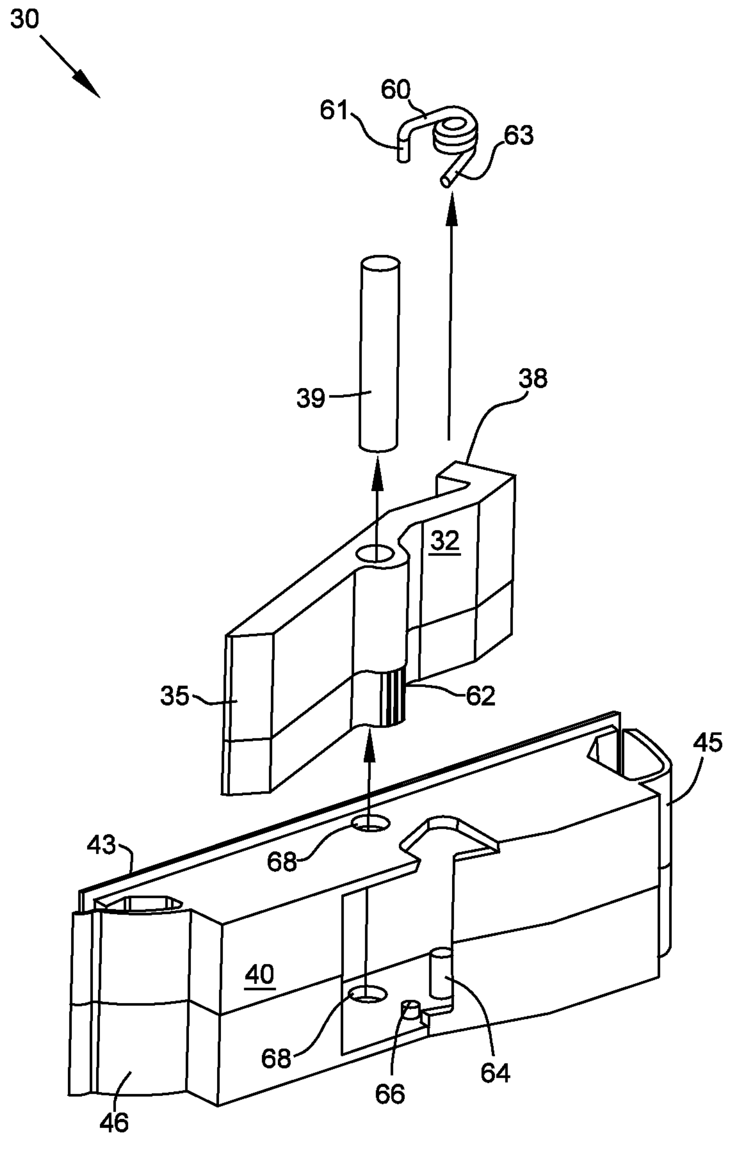
Figure 2D:
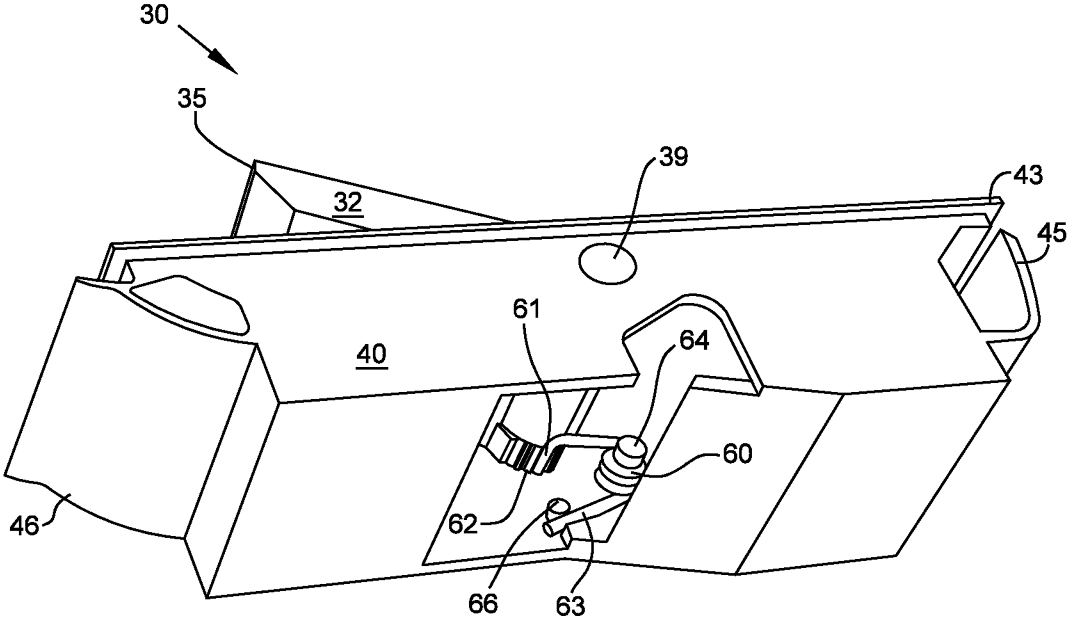
Figure 2E:
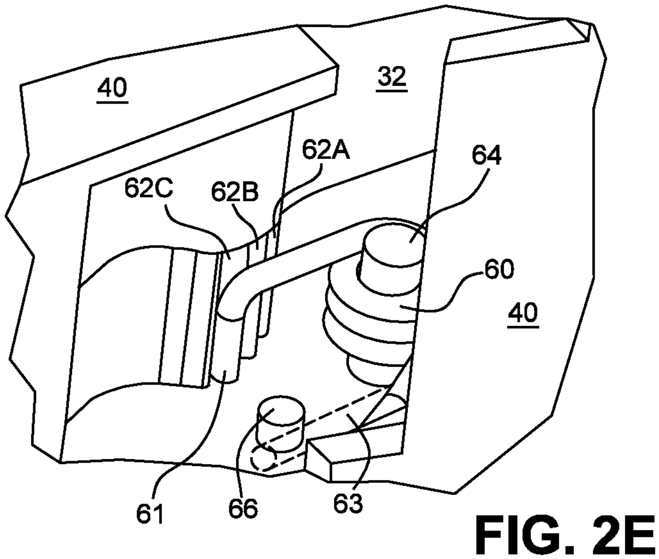

FIGS. 2A-2E illustrate panel stop assembly 30. Specifically, FIG. 2A illustrates a perspective view, FIG. 2B illustrates a side view, FIG. 2C illustrates an exploded view, FIG. 2D illustrates a bottom perspective view, and FIG. 2E illustrates a close-up bottom perspective view of panel stop assembly 30 showing spring 61 registering on a set of spring detents 62.

Panel stop assembly 30 includes panel stop 32, panel stop outer casing 40, pin 39, and detent spring 60. Panel stop 32 is pivotably mounted within recess 42 of panel stop outer casing 40 via pin 39. Panel stop assembly 30, including panel stop 32, is configured to pivotably mount within a recess of a frame member of a panel, such as in a recess of horizontal rail 13 of second panel 14 (FIG. 1).

Panel stop 32 includes a first end 35, a second end 36 opposing first end 35, a protrusion 38 proximate second end 36, and a notch 37 which allows protrusion to engage a frame member of an adjacent fenestration panel, such as vertical side jamb 15 of first panel 12 (FIG. 1). Panel stop 32 is pivotably mounted within recess 42 of panel stop outer casing 40 via pin 39.

Panel stop 32 is configured to pivot between a first stop position configured to maintain panels of a fenestration assembly, such as panels 12, 14 (FIG. 1) in a fully closed position, a second stop position configured to limit sliding of the panels beyond a preset partially-open position, and a third position substantially within a recess of frame member in which panel stop assembly 30 is mounted. In the first position, end 35 of panel stop 32 is configured to extend from recess 42 of panel stop outer casing 40 and engage a frame member of an adjacent fenestration panel (e.g., which may or may not include a stop catch 50) to maintain the panels of a fenestration assembly, such as fenestration assembly 10, in a fully closed position. In the second position, protrusion 38 of panel stop 32 is configured to extend from recess 42 of panel stop outer casing 40 and engage the frame member of an adjacent fenestration panel (e.g., by engaging directly with the panel or stop catch 50 secured to the panel) to limit sliding of the panels beyond a preset partially-open position. In the third position, panel stop 32 does not restrict a range of motion of the panels.

Panel stop outer casing 40 forms a recess 42 for receiving panel stop 32. Panel stop 32 is pivotably mounted within recess 42 via pin 39. As installed, pin 39 extends between interior surfaces of recess 42. Panel stop outer casing 40 further forms apertures 68 for receiving pin 39. Pin 39 may be secured within panel stop outer casing 40 by any suitable techniques including, but not limited to, interference fit, adhesives, welding, brazing, soldering, threads, or as a nut and bolt.

Panel stop outer casing 40 is configured for installation within a recess of frame member in which panel stop assembly 30 is mounted, such as in a recess of horizontal rail 13 of second panel 14 (FIG. 1). In some implementations, panel stop outer casing 40 includes elements to facilitate simple and secure installation. For example, as illustrated, panel stop outer casing 40 includes snap lock 45, which is configured to provide an interference fit between the recess of the frame member and an exterior surface of panel stop outer casing 40. Panel stop outer casing 40 further includes a notch 47 to receive a structural layer of the frame member at an edge of the recess of the fame member during insertion. For example, the frame member may include a generally hollow structural member, optionally filled with insulation, such as a foam material. Notch 47 is formed between protrusion 46 and rim 43. Rim 43 should have a larger perimeter than the recess within the frame member to cover the edge of the recess and provide a finished look for panel stop assembly 30 within the frame member, whether panel stop assembly 30 is part of the original construction or a retrofit feature for the panel. Mechanical attachment may also be employed to hold the assembly in position on the frame members. Fasteners may include, but are not limited to, screws, rivets, staples, adhesives, welds, and others.

For installation, protrusion 46 of panel stop outer casing 40 is first inserted within the recess of the frame member such that the structural layer of the frame member fits within notch 47. Then the opposite end of panel stop assembly 30, including snap lock 45, is inserted into the recess within the frame member until locked into place with snap lock 45. In some implementations, one installed snap lock 45 registers with an interior bottom surface of the structural layer of the frame member to prevent removal. Rim 43 functions to prevent overinsertion of panel stop assembly 30 during installation within a recess of a frame member.

In the illustrated implementation, panel stop assembly 30 further includes a spring 60, and panel stop outer casing 40 includes a set of spring detents 62 that selectably receives detent end 61 of spring 60 to bias panel stop to the different panel stop positions. Details of spring 60 and the set of spring detents 62 is best illustrated in FIG. 2E. Panel stop outer casing 40 includes a protrusion 64 sized to receive an interior diameter of the helical portion of spring 60. In some example, the helical portion of spring 60 may interference fit over protrusion 64. End 63 of spring 60 is retained in a slot adjacent spring retaining protrusion 66 of panel stop outer casing 40.

As shown in FIG. 2E, the set of spring detents 62, includes spring detents 62A, 62B, 62C, which are separated by detent ribs. Spring detents 62A, 62B, 62C are each configured to selectably bias panel stop 32 to one of the first, second, and third positions. Specifically, spring detent 62A is configured to selectably bias panel stop 32 to a first stop position that maintains the fenestration panels in a fully closed position with first end 35 extending from recess 42 of panel stop outer casing 40 to engage a frame member of an adjacent panel (see FIG. 3A). Spring detent 62C is configured to selectably bias panel stop 32 to a second stop position that to limit sliding of the fenestration panels beyond a preset partially-open position with protrusion 38 extending from recess 42 of panel stop outer casing 40 to engage the frame member of an adjacent panel (see FIG. 3B). In addition, spring detent 62B is configured to selectably bias panel stop 32 to a third position in which panel stop 32 remains substantially within recess 42 of panel stop outer casing 40 such that the third position does not restrict a range of motion of the fenestration panels (see FIG. 3C).

Figure 3A:
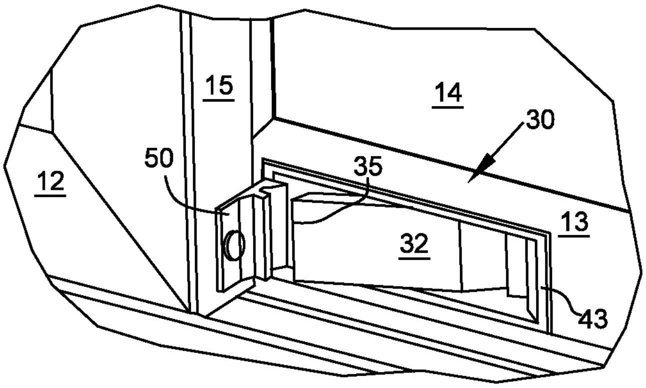
FIGS. 3A-3C illustrate a panel stop assembly in various positions to control sliding of panels.
Figure 3B:
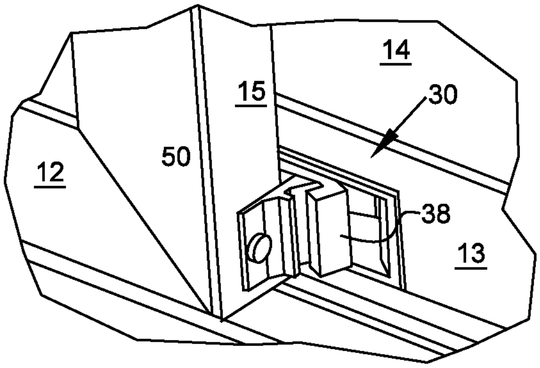
Figure 3C:
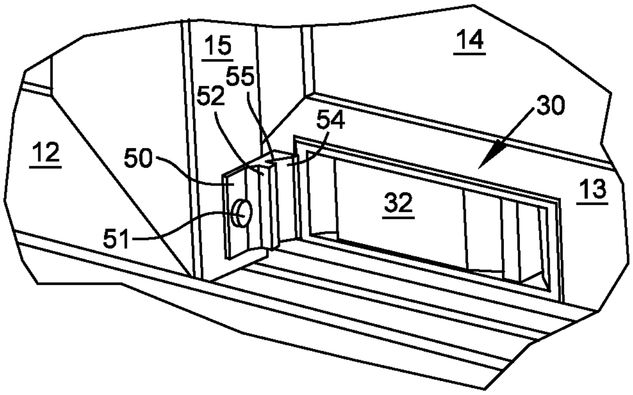

FIGS. 3A-3C illustrate panel stop assembly 30 and stop catch 50 mounted to panels 14, 12 in a fully closed position (FIG. 3A), a second stop position configured to limit sliding of panels 12, 14 beyond a preset partially-open position (FIG. 3B), and a third position substantially within the recess of the horizontal rail 13 (FIG. 3C).

As indicated in FIG. 3C, stop catch 50 is secured to vertical side jamb 15 of panel 12 via screw 51 although any suitable attachment techniques may be used. Stop catch 50 includes a recess 55 formed between a protrusion 52 and a tapered surface 54. Tapered surface 54 is configured to correspond to the angled surfaces of end 35 and protrusion 38 of panel stop 32 in order to guide end 35 or protrusion 38 of panel stop 32 into recess 55. Stop catch 50 may provide for further engagement of panel stop 32 with panel 12 than alternative implementations that do not include stop catch 50 by restricting rotation of panel stop 32 when either end 35 or protrusion 38 is engaged with stop catch 50.

Figure 4:
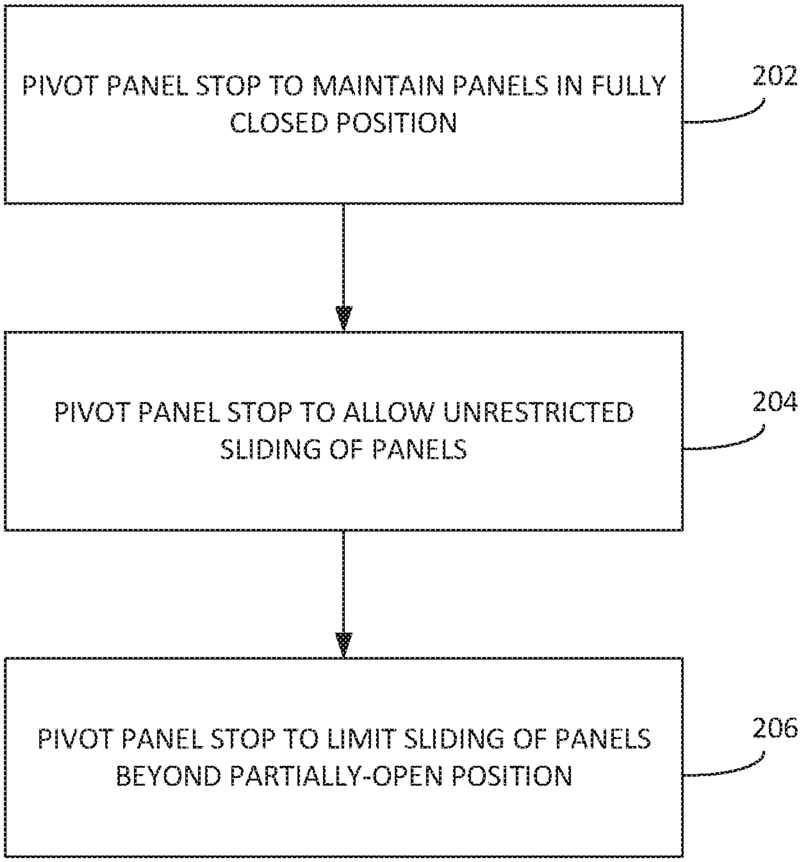
FIG. 4 is a flowchart illustrating techniques for operating a panel stop, such as a panel stop of the panel stop assembly of FIGS. 3A-3C, to control sliding of panels.

FIG. 4 is a flowchart illustrating techniques for operating a panel stop, such as panel stop 32, to control sliding of panels, such as panels 12, 14. For clarity, the technique of FIG. 4 is discussed with respect to fenestration assembly 10, including a lock kit 30 including panel stop assembly 30 and stop catch 50. The illustrated techniques include pivoting panel stop 32, which is mounted in a recess of horizontal rail 13 of second panel 14, from a third position substantially within the recess of horizontal rail 13 (see FIG. 3C) to a first stop position (see FIG. 3A) to maintain panels 12, 14 in a fully closed position (202). In the first stop position, a first end 35 of the panel stop extends from the recess of horizontal rail 13 and engages vertical side jamb 15 of panel 12 to restrict movement of panel 12 relative to panel 14.

The illustrated techniques further include pivoting panel stop 32 from the first stop position (see FIG. 3A) to the third position (see FIG. 3C), the third position not restricting a range of motion of panels 12, 14 (204). In addition, the illustrated techniques also include pivoting panel stop 32 from the third position (see FIG. 3C) to the second stop position (see FIG. 3B) to limit sliding of panels 12, 14 beyond a preset partially-open position (206). In the second stop position, protrusion 38, located proximate second end 36 (FIG. 2A) the panel stop 38 extends from the recess of the second panel and engages the frame member of the first panel 12 to limit movement of panel 12 relative to panel 14.

Pivoting the panel stop between the first stop position, the second stop position, and the third position includes pivoting the panel stop such that detent end 61 of spring 60 selectively engages spring detents 62 to selectably bias panel stop 32 between each of the first position, the second position and the third position.

Figure 5:
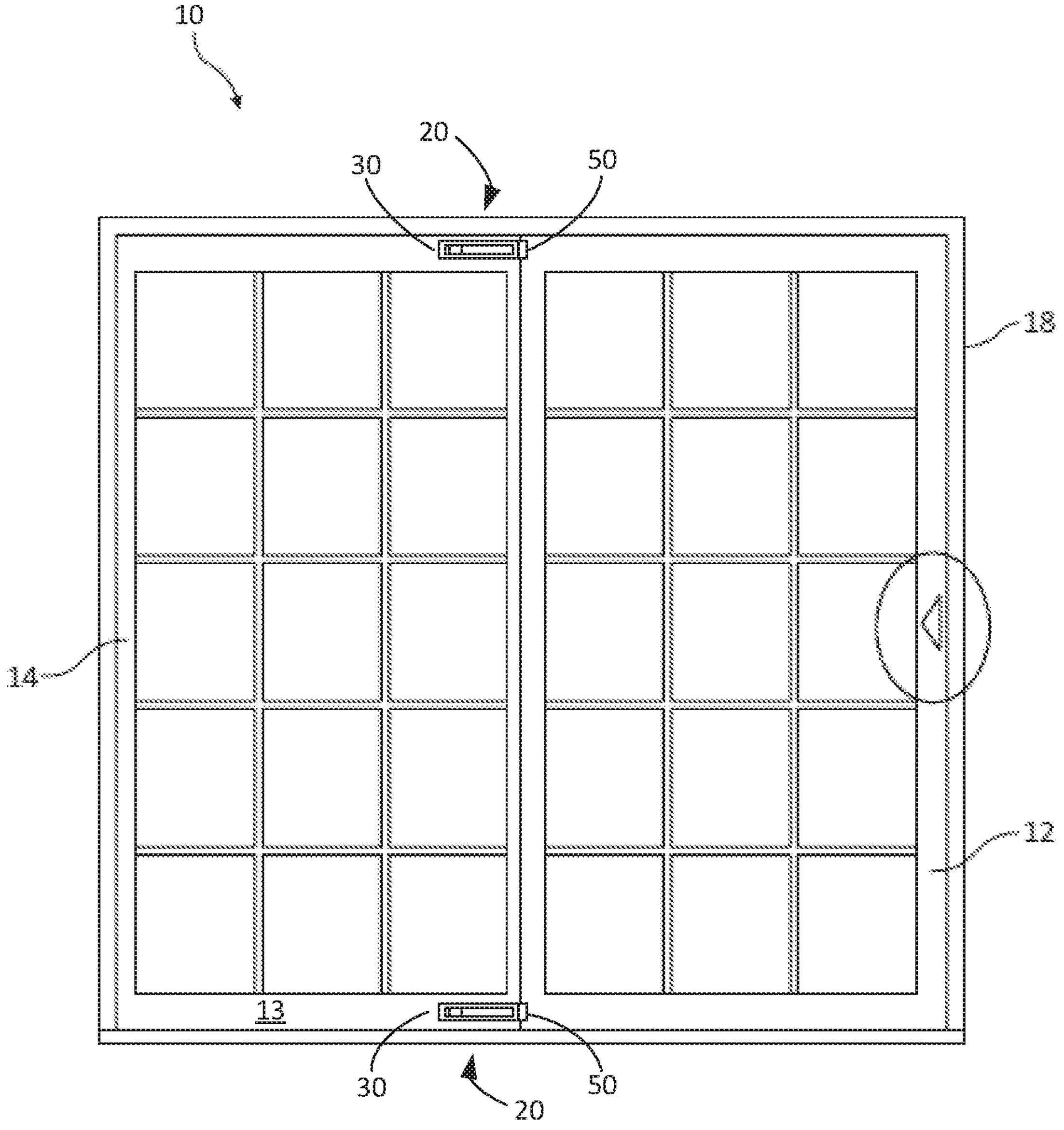
FIG. 5 is a schematic view of a fenestration assembly showing additional or alternative positions of associated lock kit(s), according to some examples.

FIG. 5 is a schematic view of a fenestration assembly showing additional or alternative positions of associated lock kit(s) 20, according to some examples. The lock kit(s) 20 optionally include features similar to those previously described. As shown, the fenestration assembly 10 additionally or alternatively includes lock kit(s) near a head of the fenestration assembly 10 (e.g., with stop assembly 30 mounted to a top horizontal rail of the second panel 14 and optional stop catch 50 mounted to top horizontal rail of first panel 12)

Figure 6:
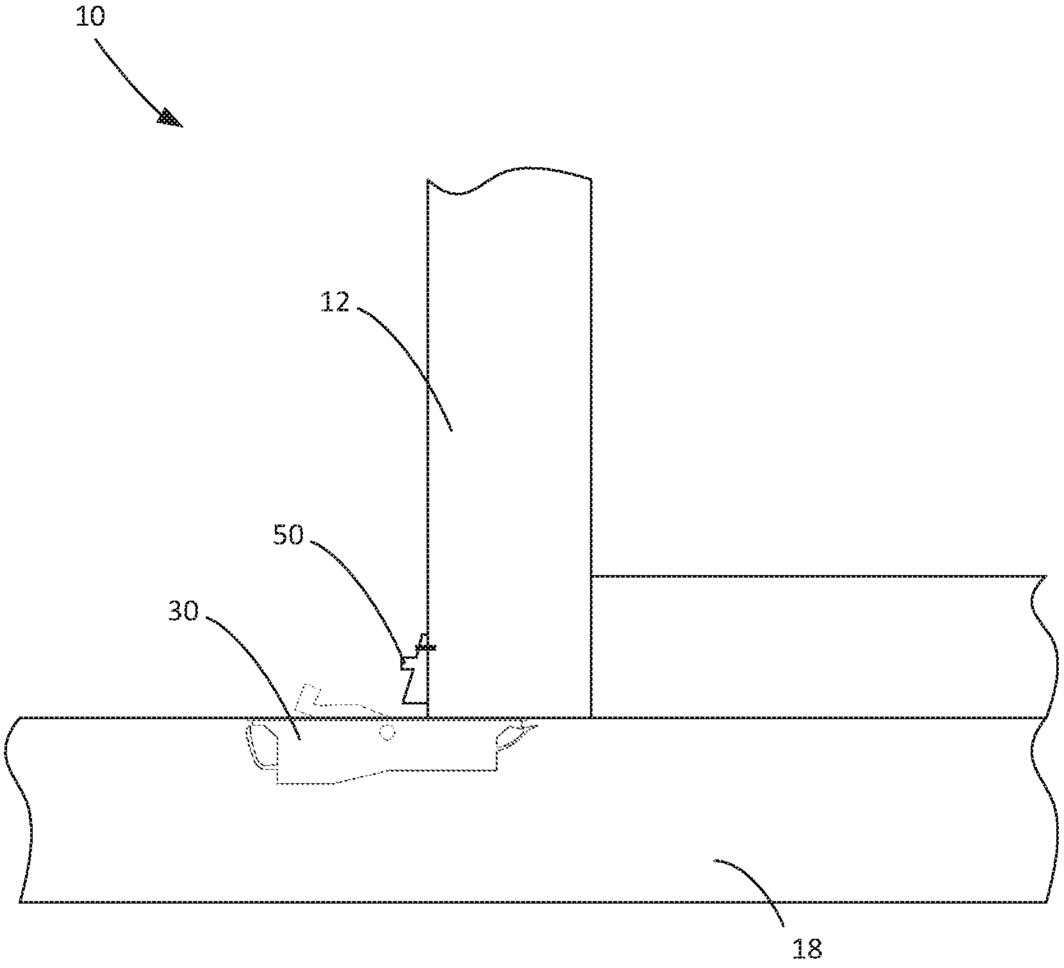
FIG. 6 is a schematic view of a fenestration assembly showing a lock kit positioned on a sill, according to some examples.

FIG. 6 shows still another additional or alternative position of an associated lock kit(s) 20. As shown, the lock kit 20 is attached to the bottom horizontal sill (the second panel 14 is removed from the schematic for ease of viewing). As shown, the stop assembly 30 is mounted into to the bottom horizontal sill of the frame 18 and the optional stop catch 50 is mounted to bottom horizontal rail of first panel 12 to interact with the stop assembly 30 in a similar manner to that previously described.

Figure 7:
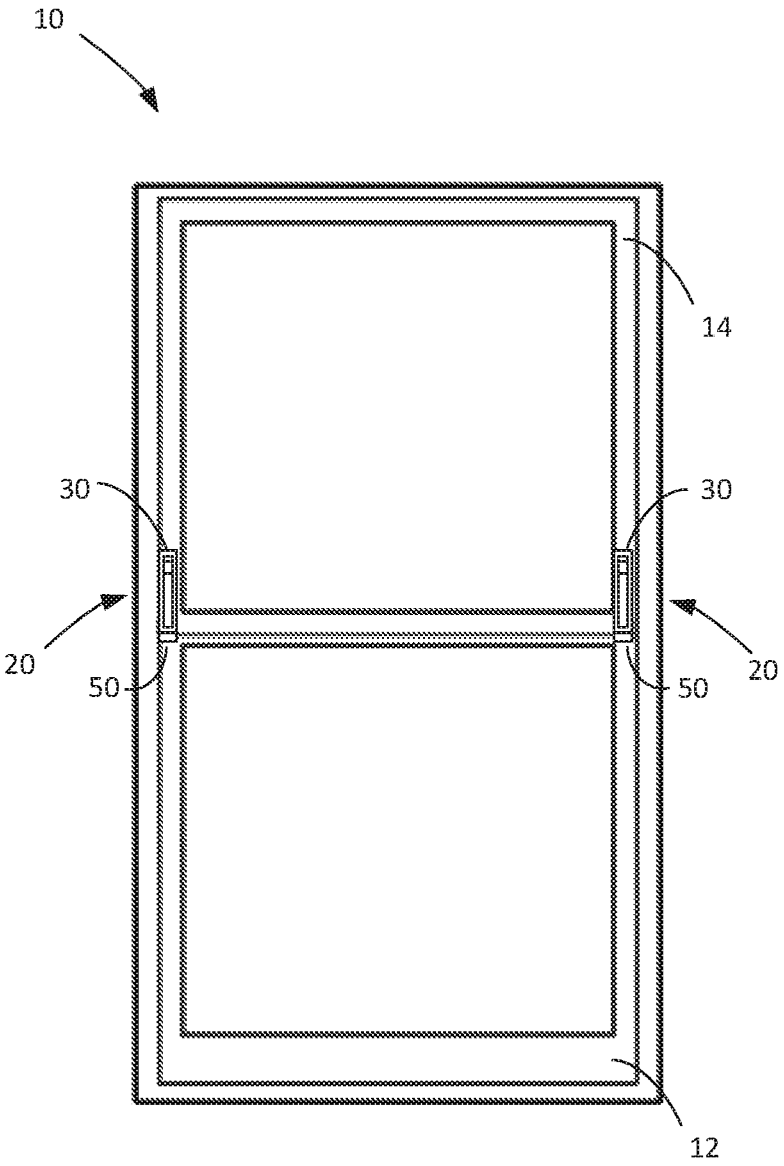
FIG. 7 is a schematic view of another fenestration assembly, according to some examples.

Regardless of whether the fenestration assembly 10 is a door or window, any of the lock kit 20 arrangements described in this disclosure are equally applicable. For example, FIG. 7 is a schematic view of another fenestration assembly 10, according to some examples. As shown, the fenestration assembly 10 is configured as a double hung window with a first panel 12 and a second panel 14 (e.g., two vertically slideable sashes) carrying one or more lock kit(s) 20 (e.g., on the respective stiles of the first panel 12 and the second panel 14 as shown). Alternatively, the fenestration assembly 10 could be configured as a single hung window with a first panel 12 and a second panel 14 (e.g. one vertically slideable sash) carrying one or more lock kit(s) 20 (e.g., on the respective stiles of the first panel 12 and the second panel 14 as shown). Alternatively, the fenestration assembly 10 could be configured as a horizontal sliding window in which the first panel 12 and a second panel 14 (e.g. one horizontally slideable sash) carrying one or more lock kit(s) 20 (e.g., on the respective stiles of the first panel 12 and the second panel 14 as shown). The lock kit(s) 20 are optionally similar to those previously described.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

What is claimed is:

1. A lock kit for a fenestration assembly including a first panel and a second panel, at least one of the first and second panels being slidable relative the other of the first and second panels, the lock kit comprising:

a panel stop configured to pivotably mount within a recess of a frame member of the first panel at a pivot location, the panel stop including a first portion and a second portion opposite the pivot location from the first portion, the panel stop configured to pivot at the pivot location between a first stop position at which the first portion of the panel stop is configured to maintain the first and second panels in a fully closed position, a second stop position at which the second portion of the panel stop is configured to limit sliding of the first and second panels beyond a preset partially-open position, and a third position substantially within the recess, the third position being configured to not restrict a range of motion of the first and second panels.

2. The lock kit of claim 1, wherein, the first position includes a first end of the panel stop, wherein in the first position, the first end of the panel stop is configured to extend from the recess of the first panel and engage a frame member of the second panel.

3. The lock kit of claim 2, wherein, the panel stop includes a protrusion proximate a second end of the panel stop, the second end opposing the first end of the panel stop, wherein in the second position, the protrusion of the panel stop is configured to extend from the recess of the first panel and engage the frame member of the second panel.

4. The lock kit of claim 3, further comprising a stop catch configured to mount to the frame member of the second panel to engage both the first end of the panel stop when the panel stop is in the first position, and the protrusion of the panel stop when the panel stop is in the second position.

5. The lock kit of claim 1, further comprising a panel stop outer casing configured to mount within the recess of the frame member of the first panel, the panel stop outer casing including a panel stop recess, with the panel stop pivotably mounted within the panel stop recess.

6. The lock kit of claim 5, further comprising a pin extending between interior surfaces of the panel stop recess, wherein the panel stop is pivotably mounted to the panel stop outer casing via the pin.

7. The lock kit of claim 5, wherein the panel stop outer casing includes a snap lock configured to provide an interference fit between the recess of the frame member of the first panel and an exterior surface of the panel stop outer casing.

8. The lock kit of claim 5, wherein the panel stop outer casing is attached within the recess by one or more fasteners.

9. The lock kit of claim 1, further comprising a spring, wherein the panel stop includes a spring detent that selectably receives the spring to bias the panel stop to the third position.

10. The lock kit of claim 9, wherein the spring detent is one of a set of spring detents, the set of spring detents configured to selectably bias the panel stop between each of the first position, the second position and the third position.

11. A fenestration assembly comprising:

a first panel including a first panel frame member forming a recess;

a second panel including a second panel frame member, at least one of the first and second panels being slidable relative the other of the first and second panels; and a lock kit comprising a panel stop pivotably mounted within the recess at a pivot location, the panel stop including a first portion and a second portion opposite the pivot location from the first portion, the panel stop pivotable at the pivot location between a first stop position at which the first portion of the panel stop maintains the first and second panels in a fully closed position, a second stop position at which the second portion of the panel stop limits sliding of the first and second panels beyond a preset partially-open position, and a third position substantially within the recess, the third position not restricting a range of motion of the first and second panels.

12. The fenestration assembly of claim 11, wherein the first portion includes a first end of the panel stop, wherein in the first position, the first end of the panel stop extends from the recess of the first panel and engages a frame member of the second panel.

13. The fenestration assembly of claim 12, wherein the second portion includes a protrusion proximate a second end of the panel stop, the second end opposing the first end of the panel stop, wherein in the second position, the protrusion of the panel stop extends from the recess of the first panel and engages the frame member of the second panel.

14. The fenestration assembly of claim 13, wherein the lock kit further comprises a stop catch mounted to the frame member of the second panel that engages both the first end of the panel stop when the panel stop is in the first position, and the protrusion of the panel stop when the panel stop is in the second position.

15. The fenestration assembly of claim 11, wherein the lock kit further comprises a panel stop outer casing mounted within the recess of the frame member of the first panel, the panel stop outer casing including a panel stop recess with the panel stop pivotably mounted within the panel stop recess.

16. The fenestration assembly of claim 15, wherein the lock kit further comprises a pin extending between interior surfaces of the panel stop recess, wherein the panel stop is pivotably mounted within the panel stop recess to the panel stop outer casing via the pin.

17. The fenestration assembly of claim 15, wherein the panel stop outer casing includes a snap lock providing an interference fit between the recess of the frame member of the first panel and an exterior surface of the panel stop outer casing.

18. The fenestration assembly of claim 11, wherein the lock kit further comprises a spring, wherein the panel stop includes a set of spring detents that selectably bias the panel stop between each of the first position, the second position and the third position.

19. The fenestration assembly of claim 11, wherein the panels are selected from a group consisting of:

sliding door panels; and sliding window panels.

20. A method of operating a lock kit of a fenestration assembly including a first panel and a second panel, at least one of the first and second panels being slidable relative the other of the first and second panels, the method comprising:

pivoting a panel stop mounted in a recess of a frame member of the first panel of the fenestration assembly from a third position substantially within the recess to a first stop position to maintain the first and second panels in a fully closed position;

pivoting the panel stop mounted in the recess from the first stop position to the third position, the third position not restricting a range of motion of the first and second panels; and pivoting the panel stop mounted in the recess from the third position to the second stop position to limit sliding of the first and second panels beyond a preset partially-open position, wherein, in the first stop position, a first end of the panel stop extends from the recess of the first panel and engages a frame member of the second panel, and wherein, in the second stop position, a protrusion proximate a second end of the panel stop extends from the recess of the first panel and engages the frame member of the second panel.

21. The method of claim 20, wherein pivoting the panel stop between the first stop position, the second stop position, and the third position comprises, pivoting the panel stop such that a spring selectively engages spring detents of a set of spring detents to selectably bias the panel stop between each of the first position, the second position and the third position.

* * * * *